United States Patent
Munoz-Bustamante et al.

(10) Patent No.: US 6,415,070 B1
(45) Date of Patent: Jul. 2, 2002

(54) METHOD AND APPARATUS FOR SWITCHING OPTICAL SIGNALS WITHIN AN OPTOELECTRIC COMPUTER NETWORK

(75) Inventors: Carlos Munoz-Bustamante, Durham; David Carroll Challener; Daniel McConnell, both of Raleigh, all of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/282,733

(22) Filed: Mar. 31, 1999

(51) Int. Cl.[7] .............................. H04J 14/00; G02B 6/02
(52) U.S. Cl. .................... 385/24; 359/118; 359/129; 385/18
(58) Field of Search .................... 385/24, 37, 33, 385/31, 17, 18, 16, 20, 21, 22, 23; 359/118, 129, 290, 291, 292

(56) References Cited

U.S. PATENT DOCUMENTS

| | | |
|---|---|---|
| 4,720,634 A | 1/1988 | D'Auria et al. |
| 4,732,446 A | 3/1988 | Gipson et al. |
| 4,838,630 A | 6/1989 | Jannson et al. |
| 5,093,879 A | 3/1992 | Bregman et al. |
| 5,093,890 A | 3/1992 | Bregman et al. |
| 5,096,279 A | 3/1992 | Hornbeck et al. |
| 5,283,447 A | 2/1994 | Olbright et al. |
| 5,404,373 A | 4/1995 | Cheng |
| 5,422,901 A | 6/1995 | Lebby et al. |
| 5,552,924 A | 9/1996 | Tregilgas |
| 5,572,540 A | 11/1996 | Cheng |
| 5,640,479 A * | 6/1997 | Hegg et al. |
| 5,673,284 A | 9/1997 | Congdon et al. |
| 5,708,280 A | 1/1998 | Lebby et al. |
| 5,789,733 A | 8/1998 | Jackimowicz et al. |
| 6,097,859 A * | 8/2000 | Solgaard et al. .............. 385/17 |
| 6,204,946 B1 * | 3/2001 | Aksyuk et al. ............. 359/131 |
| 6,263,123 B1 * | 7/2001 | Bishop et al. ................ 385/15 |

* cited by examiner

*Primary Examiner*—Frank G. Font
*Assistant Examiner*—Layla Lauchman
(74) *Attorney, Agent, or Firm*—Andrew Dillon

(57) ABSTRACT

A method and apparatus for switching optical signals within an optoelectric computer network is disclosed. The optoelectric computer network includes multiple computers. Each of the computers includes a first fiber optic cable for sending optical signal beams and a second fiber optic cable for receiving optical signal beams. In accordance with a preferred embodiment of the present invention, an apparatus for broadcasting optical signals within the optoelectric computer network includes a prism and a mirror array. The prism is capable of splitting an optical signal beam from a first fiber optic cable of one of the computers into multiple optical signal beams. Each of the optical signal beams is of an unique frequency within a light spectrum. The mirror array, which is formed by an array of deformable mirrors, then individually directs each of the optical signal beams to a respective second fiber optic cable of the rest of the computers.

3 Claims, 4 Drawing Sheets

METHOD AND APPARATUS FOR SWITCHING OPTICAL SIGNALS WITHIN AN OPTOELECTRIC COMPUTER NETWORK

BACKGROUND OF THE INVENTION

1. Technical Field

The present invention relates to a method and apparatus for signal transmission in general, and in particular to a method and apparatus for transmitting optical signals. Still more particularly, the present invention relates to a method and apparatus for switching optical signals within an optoelectric computer network.

2. Description of the Prior Art

An optoelectric computer network is a computer network in which digital data signals are passed in both optical pathways and electrically conductive pathways. Most, if not all, of the computers within an optoelectric computer network are optoelectric computers. An optoelectric computer is a computer system in which digital data signals are transmitted in both electrically conductive buses and optical buses (or pathways). Typically, an optoelectric computer is equipped with optical link capabilities and may, for example, utilize semiconductor devices that have vertical cavity surface emitting lasers (VCSELs) serving as transducers for optoelectric exchange.

Within an optoelectric computer network, an optical hub may be utilized to provide information exchange among all computers within the network. The optical hub is analogous to an electrical network switch, and it allows concurrent communications among multiple computers. In such optoelectric computer network, difficulty is anticipated in efficiently allocating available optical pathway resources for transmission of optical signals, particularly where the optical pathway capabilities exceed the capabilities of electrically conductive pathways such as legacy busses retained from earlier generations of data processing systems. In many optoelectric computers currently in use, selected frequencies of the light spectrum are allocated to contain a specific data stream. In those cases, it becomes necessary to switch those data streams among various optical pathways such as an optical hub. The present disclosure provides an apparatus for switching optical signals within the optical hub of an optoelectric computer network.

SUMMARY OF THE INVENTION

An optoelectric computer network includes multiple computers. Each of the computers includes a first fiber optic cable for sending optical signal beams and a second fiber optic cable for receiving optical signal beams. In accordance with a preferred embodiment of the present invention, an apparatus for broadcasting optical signals within the optoelectric computer network includes a prism and a mirror array. The prism is capable of splitting an optical signal beam from a first fiber optic cable of one of the computers into multiple optical signal beams. Each of the optical signal beams is of an unique frequency within a light spectrum. The mirror array, which is formed by an array of deformable mirrors, then individually directs each of the optical signal beams to a respective second fiber optic cable of the rest of the computers.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
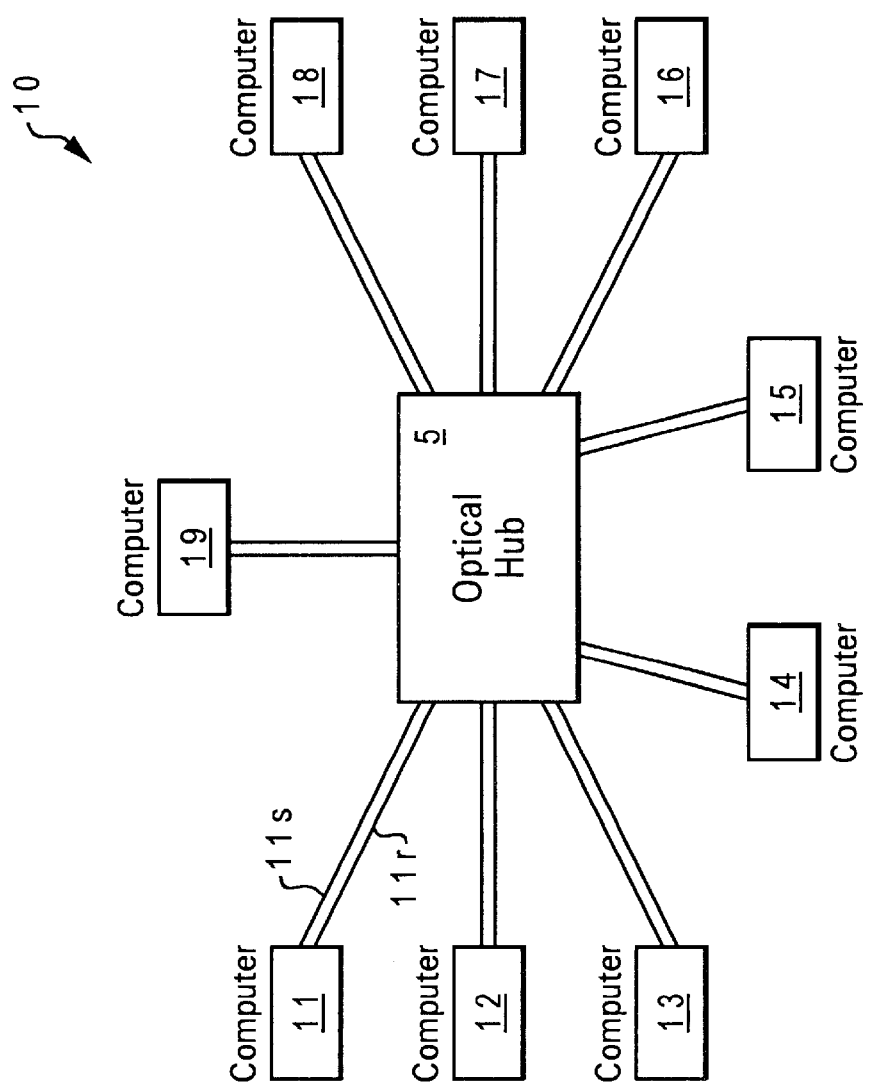
FIG. 1 is a block diagram of an optoelectric computer network having optical links, in accordance with a preferred embodiment of the present invention.

Referring now to the drawings and in particular to FIG. 1, there is illustrated a block diagram of an optoelectric computer network having optical links, in accordance with a preferred embodiment of the present invention. Optoelectric computer network 10 may be a local-area network (LAN) or a wide-area network (WAN). As shown, optoelectric computer network 10 includes computers 11–19 and an optical hub 5. Each of computers 11–19 may be a personal computer, a mid-range computer, or a mainframe computer. Preferably, each of computers 11–19 has optical link capabilities such that all computers 11–19 can be interconnected to each other via an optical hub 5. The optical link between one of computers 11–19 and optical hub 5 comprises at least two fiber optic cables, one for transmitting optical signals to optical hub 5 and the other for receiving optical signals from optical hub 5. For example, a fiber optic cable 11s conveys optical signals from computer 11 to optical hub 5, and a fiber optic cable 11r conveys optical signals from optical hub 5 to computer 11. All communication among computers 11–19 is performed by optical hub 5. In essence, optical hub 5 acts a network switch for computers 11–19 within optoelectric computer network 10.

Figure 2:
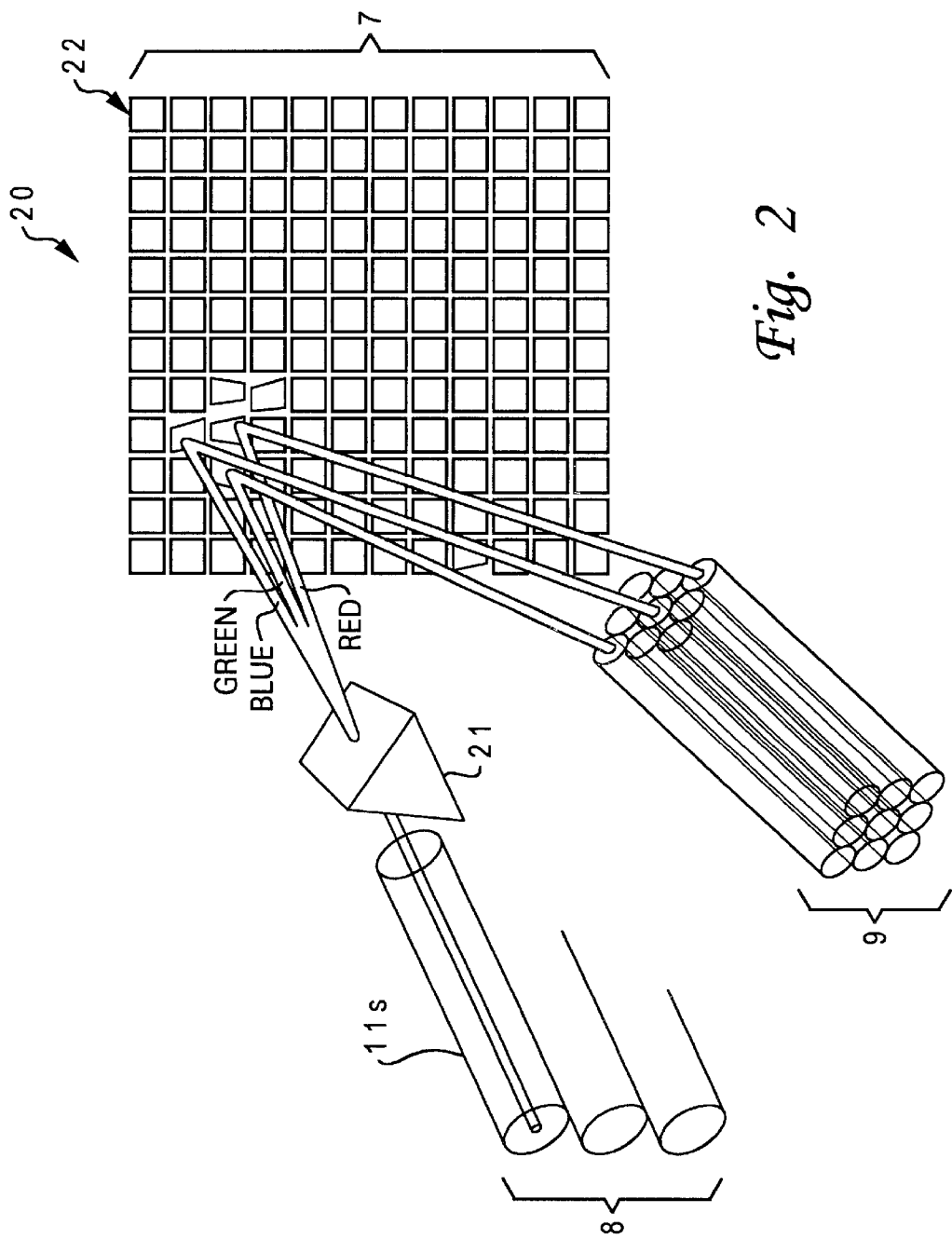
FIG. 2 is a graphical view of a network switching mechanism within the optical hub from FIG. 1, in accordance with a preferred embodiment of the present invention.

With reference now to FIG. 2, there is illustrated a graphical view of a network switching mechanism within optical hub 5, in accordance with a preferred embodiment of the present invention. As shown, network switching mechanism 20 includes a prism 21 and a mirror array 7. Mirror array 7 is preferably a deformable mirror device (DMD) having multiple mirrors, such as mirror 22, organized in the form of an array. Details of a DMD will be explained later. Fiber optic bundle 8 comprises a group of fiber optic cables, each corresponding to one of computers 11–19 from FIG. 1. Each fiber optic cable transmits optical signals from a respective computer to mirror array 7. For example, fiber optic cable 11s transmits optical signals from computer 11 (from FIG. 1) to mirror array 7. Similarly, fiber optic bundle 9 comprises a group of fiber optic cables, each corresponding to one of computers 11–19 from FIG. 1. Each fiber optic cable within fiber optic bundle 9 conveys optical signals from mirror array 7 to a respective computer. Each mirror within mirror array 7 can be independently adjusted to reflect an optical signal incident from a fiber optic cable within fiber optic bundle 8 to a desired fiber optic cable within fiber optic bundle 9. If computer 11 (from FIG. 1) desires to transmit certain information to some of the computers within computer network 10, computer 11 first sends the corresponding optical signal via fiber optic cable 11s. When different information is intended to include with a single optical signal, each of the different information is modulated within the optical signal under an unique light frequency. The optical signal is then split by prism 21 into several optical signal beams, each preferably having a different frequency. As shown, the optical signal beams coming out from prism 21 includes a red beam, a green beam, and a blue beam. These optical signal beams are subsequently reflect by mirror array 7. Once again, each DMD within mirror array 7 is then independently adjusted to an angle such that all the optical signal beams coming from prism 21 are directed into a corresponding fiber optic cable within fiber optic bundle 9. As a result, the information from computer 11 will be sent to the receiving computers within computer network 10.

As mentioned earlier, mirror array 7 is preferably a DMD. A DMD is a transducer that modulates incident light in a spatial pattern corresponding to an electrical or optical input. The incident light may be modulated in its phase, intensity, polarization, or direction, and the light modulation may achieved by a variety of materials exhibiting various opto-electric or optomagneto effects and by material that modulates light by surface deformation. A DMD is typically formed of area arrays of pixels (or mirrors) in which each pixel is individually addressable and contains at least one deflectable reflecting beam. A DMD operates by reflecting light off of the pixels, and the reflected light is modulated by varying the deflection of the deflectable beams.

Figure 3A:
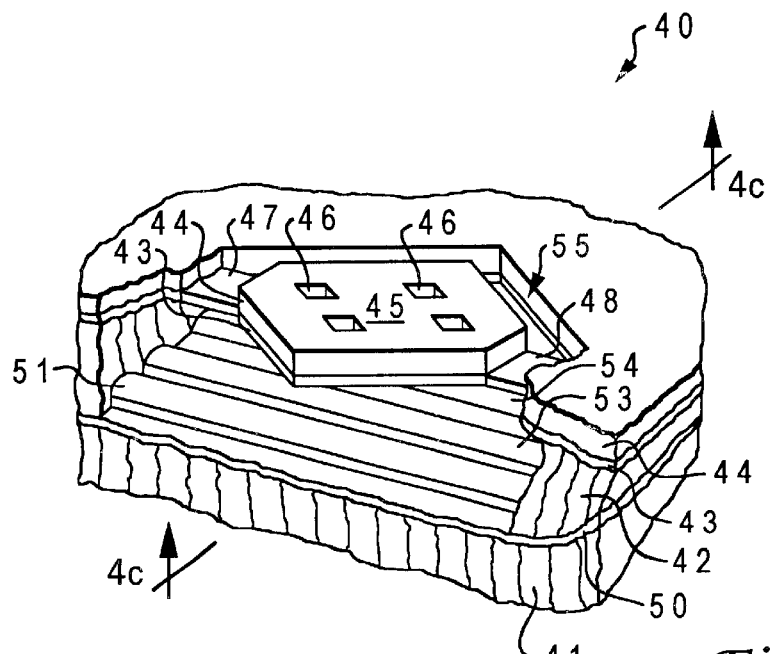
FIGS. 3a–3c are a perspective view, a plan view, and a cross-sectional view, respectively, of a single pixel of a deformable mirror device, in accordance with a preferred embodiment of the present invention.
Figure 3B:
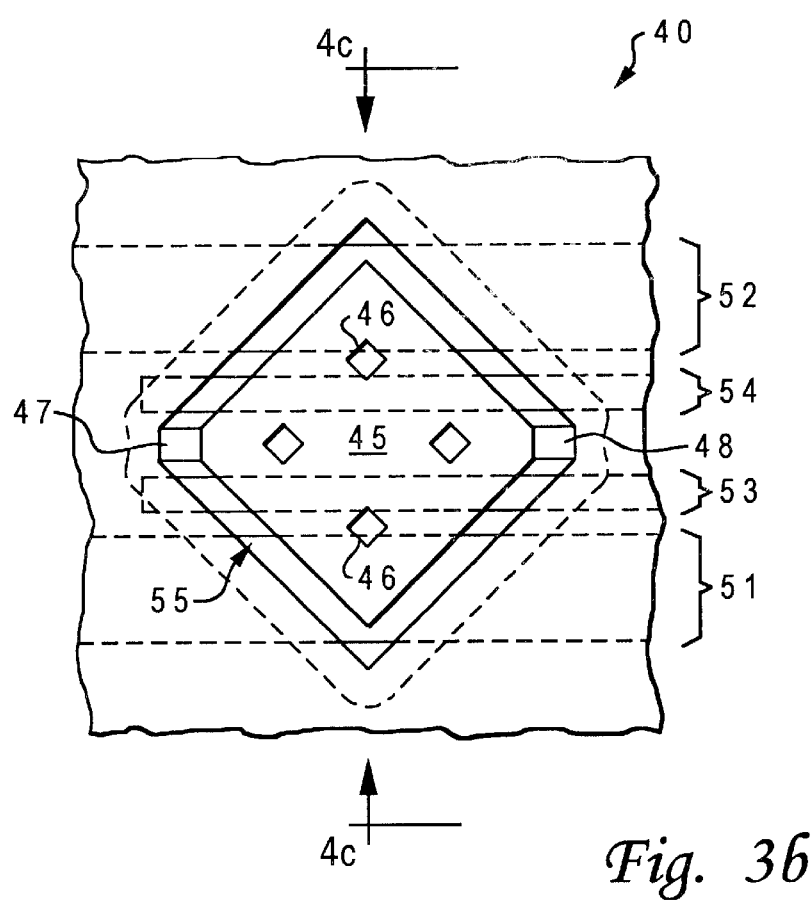
Figure 3C:
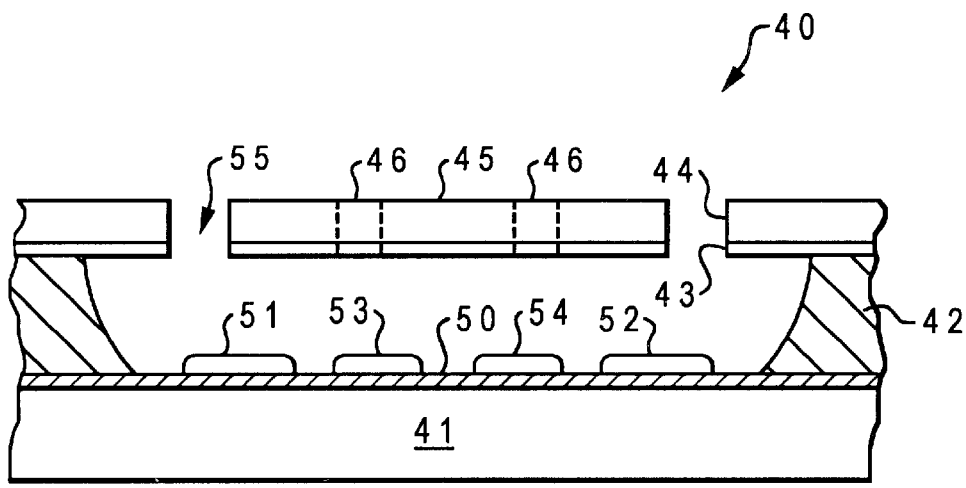

Referring now to FIGS. 3a–3c, there are depicted a single pixel of a DMD in perspective view, in plan view, and in cross-sectional view, respectively, in accordance with a preferred embodiment of the present invention. FIG. 3c is a cross section along line c—c as indicated in FIGS. 3a and 3b. A pixel within a DMD is basically a beam (or a flap) covering a shallow well. As shown, a pixel 40 includes a silicon substrate 41, an insulating spacer 42, a metal hinge layer 43, a metal beam layer 44, a beam 45, and multiple plasma etch access holes 46 in beam 45. Portions 47 and 48 of hinge layer 43 that are not covered by beam layer 44 form torsion hinges (torsion rods) attaching beam 45 to the portion of layers 43 and 44 supported by spacer 42. Electrodes 51–54 run between spacer 42 and substrate 44 and are isolated from substrate 41 by silicon dioxide layer 50.

A preferred set of dimensions for pixel 40 is as follows: beam 45 is a square with sides 12.5 microns long, spacer 42 is 4.0 microns thick, hinge layer 43 is 800 Å thick, beam layer 44 is 3,600 Å thick, each of hinges 47, 48 is 4.6 microns long and 1.8 microns wide, plasma etch access holes 46 are 2.0 microns square, and plasma etch access gap 55 (the space between beam 45 and the remainder of beam layer 44) is 2.0 microns wide. An alternative set of dimensions for pixel 40 to yield a maximum beam deflection angle of about ten degrees is as follows: beam 45 is a square with side 19 microns long, spacer 42 is 2.3 microns thick, hinge layer 43 is 750 Å thick, beam layer 44 is 3,000 Å thick, each of torsion hinges 47, 48 is 4.6 microns long and 1.0 microns wide, plasma etch access holes 46 are 1.5 microns square, and plasma etch access gap 55 is 1.0 micron wide.

Substrate 41 is silicon having resistivity about 10 ohm-cm. Spacer 42 is an insulator; both hinge layer 43 and beam layer 44 are an alloy of aluminum, titanium, and silicon (Ti:Si:Al) with 0.2% Ti and 1% Si. This alloy has a coefficient of thermal expansion not drastically different from spacer 42 and thus minimizes the stress between the metal layers and spacer 42 generated during the fabrication process. Note that any stress between layers in the beam or hinge would cause warping or curling of the beam or hinge, and any stress between the metal and the spacer can cause buckling or warping of the free portion of the metal over the well.

Pixel 40 is operated by applying a voltage between metal layers 43, 44 and electrodes 53 or 54 on substrate 41; beam 45 and the electrodes form the two plates of an air gap capacitor and the opposite charges induced on the two plates by the applied voltage exert electrostatic force attracting beam 45 to substrate 41, whereas electrodes 51 and 52 are held at the same voltage as beam 45. This attractive force causes beam 45 to twist at hinges 47, 48 and be deflected towards substrate 41.

Figure 4:
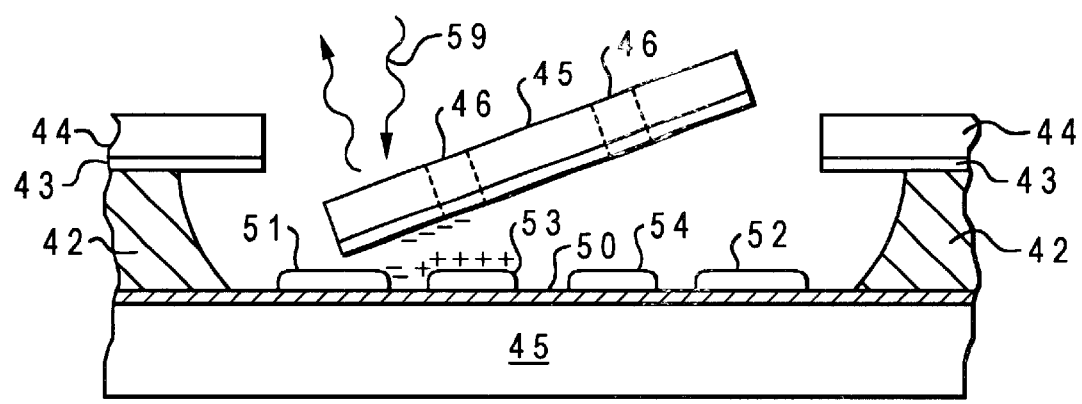
FIG. 4 is a schematic view of a beam deflection in accordance with a preferred embodiment of the present invention.

With reference now to FIG. 4, there is illustrated a schematic view of the above-mentioned deflection together with an indication of the charges concentrated at the regions of smallest gap for a positive voltage applied to electrode 53. For voltages in the range of 20 volts, the deflection is in the range of 2 degrees. However, if hinge 47 were made longer or thinner or narrower, the deflection would increase as the compliance of hinge 47 varies linearly with the inverse of its width and directly with the square of its length and inversely with the cube of its thickness. Note that the thickness of beam 45 prevents significant warping of beam 45 due to surface stress generated during processing, but that the thinness of hinge 47 allows for large compliance. FIG. 5 also indicates the reflection of light from deflected beam 45 as may occur during operation.

As has been described, the present invention provides a method and apparatus for switching optical signals within an optoelectric computer network.

While the invention has been particularly shown and described with reference to a preferred embodiment, it will be understood by those skilled in the art that various changes in form and detail may be made therein without departing from the spirit and scope of the invention.

What is claimed is:

1. An optoelectric computer network, comprising:
    a plurality of computers, wherein each of said plurality of computers includes a first fiber optic cable for sending optical signal beams and a second fiber optic cable for receiving optical signal beams; and
    an optical hub coupled to said plurality of computers, wherein said optical hub includes:
        a prism capable of splitting an optical signal beam from a first fiber optic cable of one of said plurality of computers into a plurality of optical signal beams, wherein each of said plurality of optical signal beams is of an unique frequency within a light spectrum; and
        a mirror array having a plurality of deformable mirrors that individually directs each of said plurality of optical signal beams to a respective second fiber optic cable of at least one of the rest of said plurality of computers.

2. The optoelectric computer network according to claim 1, wherein said mirror array is a deformable mirror device.

3. The optoelectric computer network according to claim 1, wherein said optical signal beam includes information modulated under a plurality of light frequencies.

* * * * *